(12) United States Patent
Levasseur et al.

(10) Patent No.: US 8,673,170 B2
(45) Date of Patent: Mar. 18, 2014

(54) NON-HOMOGENOUS POSITIVE ELECTRODE MATERIALS COMBINING HIGH SAFETY AND HIGH POWER IN A LI RECHARGEABLE BATTERY

(75) Inventors: Stephane Levasseur, Brussels (BE); Philippe Carlach, Antwerp (BE); Randy De Palma, Maasmechelen (BE); Michèle Van Thournout, Isières (BE)

(73) Assignee: Umicore, Brussels (BE)

( * ) Notice: Subject to any disclaimer, the term of this patent is extended or adjusted under 35 U.S.C. 154(b) by 110 days.

(21) Appl. No.: 13/201,896

(22) PCT Filed: Jan. 29, 2010

(86) PCT No.: PCT/EP2010/000545
§ 371 (c)(1),
(2), (4) Date: Dec. 14, 2011

(87) PCT Pub. No.: WO2010/094394
PCT Pub. Date: Aug. 26, 2010

(65) Prior Publication Data
US 2012/0104311 A1   May 3, 2012

Related U.S. Application Data

(60) Provisional application No. 61/202,396, filed on Feb. 25, 2009, provisional application No. 61/213,252, filed on May 20, 2009.

(30) Foreign Application Priority Data

Feb. 20, 2009   (EP) ..................................... 09002410
May 15, 2009   (EP) ..................................... 09006586

(51) Int. Cl.
*H01M 4/88*   (2006.01)
(52) U.S. Cl.
USPC ...... 252/182.1; 429/217; 429/221; 429/231.3

(58) Field of Classification Search
USPC ...................... 252/182.1; 429/217, 221, 231.3
See application file for complete search history.

(56) References Cited

U.S. PATENT DOCUMENTS

2006/0263690 A1   11/2006   Suhara et al.
2007/0122705 A1*  5/2007   Paulsen et al. ............. 429/231.3

(Continued)

FOREIGN PATENT DOCUMENTS

| DE | 102006049098 | 4/2008 |
|---|---|---|
| EP | 1450423 | 8/2004 |

(Continued)

OTHER PUBLICATIONS

Choi et al., "Particle Size Effects on Temperature-Dependent Performance of $LiCoO_2$ in Lithium Batteries," J. Power Sources, vol. 158, (2006), pp. 1419-1424.

(Continued)

*Primary Examiner* — Khanh Tuan Nguyen
(74) *Attorney, Agent, or Firm* — Brinks Gilson & Lione (57) ABSTRACT

The invention relates to a $Li_aNi_xCo_yM_zO_{2\pm e}A_f$ composite oxide for use as a cathode material in a rechargeable battery, with a non-homogenous Ni/Al ratio in the particles, allowing excellent power and safety properties when used as positive electrode material in Li battery. More particularly, in the formula $0.9 < a < 1.1$, $0.3 \leq x \leq 0.9$, $0 \leq y \leq 0.4$, $0 < z \leq 0.35$, $e = 0$, $0 \leq f \leq 0.05$ and $0.9 < (x+y+z+f) < 1.1$; M consists of either one or more elements from the group Al, Mg and Ti; A consists of either one or more elements from the group S and C. The powder has a particle size distribution defining a D10, D50 and D90; and said x and z parameters varying with the particles size of said powder, and is characterized in that either one or both of: $x1-x2 \geq 0.010$ and $z2-z1 \geq 0.010$; $x1$ and $z1$ being the parameters corresponding to particles having a particle size D90; and $x2$ and $z2$ being the parameters corresponding to particles having a particle size D10.

12 Claims, 7 Drawing Sheets

(56) References Cited

U.S. PATENT DOCUMENTS

| | | |
|---|---|---|
| 2008/0044736 A1 | 2/2008 | Nakura |
| 2009/0148772 A1 | 6/2009 | Kawasato et al. |
| 2009/0314985 A1 | 12/2009 | Malcus et al. |

FOREIGN PATENT DOCUMENTS

| | | | | |
|---|---|---|---|---|
| EP | 1653534 | | 5/2006 | |
| JP | 2004119218 | | 4/2004 | |
| JP | 2008-153017 | * | 7/2008 | ............. H01M 4/58 |
| WO | WO 2005/064715 | | 7/2005 | |
| WO | WO 2008/084679 | | 7/2008 | |

OTHER PUBLICATIONS

International Preliminary Report on Patentability, issued in PCT/US2010/000545, dated Aug. 23, 2011.

International Search Report, issued in PCT/US2010/000545, dated Apr. 9, 2010.

Jiang et al., "Effects of Particle Size and Electrolyte Salt on the Thermal Stability of $Li_{0.5}CoO_2$," Electroch. Acta, vol. 49, (2004), pp. 2661-2666.

Paulsen et al., "Core-Shell Cathode Material with Size-Dependent Composition," Electrochemical and Solid-State Letters, vol. 10, No. 4, (2007), pp. A101-A105.

* cited by examiner

Fig.7 (Counter Ex)

NON-HOMOGENOUS POSITIVE ELECTRODE MATERIALS COMBINING HIGH SAFETY AND HIGH POWER IN A LI RECHARGEABLE BATTERY

This application is a National Stage application of International Application No. PCT/EP2010/000545, filed Jan. 29, 2010, which claims the benefit of U.S. Provisional Application No. 61/202,396, filed Feb. 25, 2009, and U.S. Provisional Application No. 61/213,252, filed May 20, 2009, the entire contents of which are hereby incorporated herein by reference. This application also claims priority under 35 U.S.C. §119 to European Patent Application No. 09002410.0, filed Feb. 20, 2009, and European Patent Application No. 09006586.3, filed May 15, 2009, the entire contents of which are hereby incorporated herein by reference.

The invention relates to a $Li_aNi_xCo_yAl_zO_2$ composite oxide with a non-homogenous Ni/Al ratio in the particles, allowing excellent power and safety properties when used as positive electrode material in Li battery.

Due to their high energy density, rechargeable lithium and lithium-ion batteries can be used in a variety of portable electronics applications, such as cellular phones, laptop computers, digital cameras and video cameras. Commercially available lithium-ion batteries typically consist of graphite-based anode and $LiCoO_2$-based cathode materials. However, $LiCoO_2$-based cathode materials are expensive and typically have a relatively low capacity of approximately 150 mAh/g.

Alternatives to $LiCoO_2$-based cathode materials include $LiNiO_2$-based cathode materials, which are less expensive. Typical $LiNiO_2$-based cathode materials include compositions having a formula $LiNi_{0.8}Co_{0.2}O_2$. These materials are relatively more expensive than cobalt-free $LiNiO_2$-based cathode material due to the higher cost of cobalt relative to nickel, but are far easier to manufacture. Nevertheless, LiNiCoO$_2$-based cathode materials usually have a lower safety in the charged state compared to $LiCoO_2$-based cathode materials, because of the lower structural stability of $LiNiO_2$ type cathode materials.

A way to improve the safety has been to dope $LiNiCoO_2$ materials with inert elements such as Al, Mg, Ti, in order to stabilise the structure when heated in the charged state. A drawback to that major improvement regarding safety is the fact that inert element doping is detrimental for power and reversible capacity within the $LiNiCoO_2$ material. In order for this material to be industrially usable, manufacturers had to find a compromise between safety and performance, thus using the lowest amounts of Al, Ti and Mg required for obtaining a satisfying safety, while keeping decent power and capacity performances. Such products, like the $LiNi_{0.8}Co_{0.15}Al_{0.05}O_2$ (also referred to as "NCA" product) or $LiNi_{0.7}Co_{0.2}Ti_{0.05}Mg_{0.05}O_2$ compositions for example, are nowadays commercialized by companies like TODA, Honjo-FMC and Nichia. However, as explained above, these products typically suffer from a difficult compromise between safety and electrochemical performances, thus resulting in medium level of overall performances.

With the appearance of new applications for large batteries on the market (e.g. for hybrid vehicles or stationary power devices) and a need for meeting high safety requirements, without compromising on power performances, it appears that a breakthrough is needed in the synthesis of these NiCo-based materials.

As there has always been a concern to manufacture materials that are as homogeneous as possible, the state of the art manufacturing process of $Li_aNi_xCo_yM_zO_2$ (M=Al, Mn, Ti, Mg . . . ) products uses doped precursors such as hydroxides (see for example in U.S. Pat. No. 6,958,139), carbonates, nitrates or oxides, that are sintered at temperatures above 600° C. Thus, the material is perfectly homogeneous in composition, and the resulting positive electrode material shows medium level of global performances. Considering fundamentals from solid state chemistry applied to battery materials, it is known that for $LiCoO_2$ material, smaller particle size gives better power performances (as discussed in Choi et al., J. Power Sources, 158 (2006) 1419). It is however also known that a smaller particle size gives lower safety, as safety characteristics are somewhat linked to surface area (see for example Jiang et al., Electroch. Acta, 49 (2004) 2661). It follows that for the $LiNi_xCo_yM_zO_2$ system, where the presence of given amounts of Ni and M (M being e.g. Al) are focussed both on improving power behaviour and safety, a homogenous composition both for small and large particles leads to a compromise between power and safety performance, due to the unavoidable spread of particle size. Indeed, for the small particles in which safety behaviour is directly related to M content, a higher M concentration would be needed to achieve the same safety behaviour as for larger particles. On the other hand, the increase of the nickel content in the large particles could enhance the performances of the $LiNi_xCo_yM_zO_2$ system.

The present invention provides for a solution to this problem. It covers a lithium metal oxide powder for use as a cathode material in a rechargeable battery, having a general formula $Li_aNi_xCo_yM_zO_{2\pm e}A_f$, with $0.9<a<1.1$, $0.3\leq x\leq 0.9$, $0<y\leq 0.4$, $0<z\leq 0.35$, $e<0.02$ (mostly $e\approx 0$ or e being close to 0), $0\leq f\leq 0.05$ and $0.9<(x+y+z+f)<1.1$; M consisting of either one or more elements from the group Al, Mg and Ti; A consisting of either one or both of S and C; said powder having a particle size distribution defining a D10, D50 and D90; and said x and z parameters varying with the particles size of said powder, and characterized in that either one or both of:
x1−x2≥0.010 and z2−z1≥0.010;
x1 and z1 being the parameters corresponding to particles having a particle size D90; and x2 and z2 being the parameters corresponding to particles having a particle size D10. For the corresponding Co contents preferably the absolute value of (y1−y2) is less than 0.010, or even y1=y2=y.

Preferably both x1−x2≥0.030 and z2−z1≥0.030; and more preferably both
x1−x2≥0.050 and z2−z1≥0.050.

In another preferred embodiment, the Ni content of said powder increases with increasing particle size, and the M content of said powder decreases with increasing particle size.

In preferred oxide powders M consists of Al. In another embodiment A consists of either one or both of S and C with f≤0.02. Also preferred is an embodiment where A consists of C, with f≤0.01. One embodiment consists of an oxide powder having a general formula $Li_aNi_{0.80}Co_{0.15}Al_{0.05}C_{0.01}O_2$.

It should be mentioned here that WO2005/064715 describes a cathode active material comprising a lithium transition metal oxide $Li_aM_bO_2$, with $M=A_zA'_zM'_{1-z-z'}$, M' being $Mn_xNi_yCo_{1-x-y}$, A=Al, Mg or Ti and A' being a further dopant, where $0\leq x\leq 1$, $0\leq y\leq 1$, $0\leq z+z'\leq 1$, $z'<0.02$. The composition M of this product varies with the size of the particles. In particular, smaller particles contain less cobalt and more manganese than larger particles. The Ni, Al, Mg and Ti contents however do not vary as described above.

The invention also covers the use of the oxide powder described before in a Li secondary battery.

The invention is directed also at a process for the manufacture of the powder oxide according to the invention, and comprising the steps of:
- providing for at least two $Li_aNi_xCo_yM_zO_{2\pm e}A_f$ precursor powders having a different particle size distribution characterized by different D10 and D90 values, and wherein a powder having a lower D10 and D90 value has a lower Ni content and a higher M content than a powder having a higher D10 and D90 value,
- mixing said at least two precursor powders together with a lithium precursor, preferably lithium hydroxide,
- heating said mixture at a temperature of at least 600° C.

Preferably, said precursor powders are hydroxide or oxyhydroxide compositions obtained by precipitating metal sulphates, nitrates, chlorides or carbonates in the presence of an alkali hydroxide and a chelating agent, preferably ammonia. It is well known that the precipitation of such hydroxides or oxyhydroxides lead to the formation of Layered Double Hydroxides or LDH. Those LDH are made of layers of metal hydroxides into which water and anions are intercalated. Therefore, the materials contain anions such as sulphate, nitrates, chlorides or carbonates. Hence, the anion content in the material can amount up to 5 wt %.

Also, preferably the Co content of said precursor powders are identical.

The invention covers a material having a formula $Li_aNi_xCo_yM_zO_2A_f$ for use as positive electrode in Li batteries, and having a non-homogeneous Nickel-M ratio in the particles for a constant cobalt content. This comes to meet the need for a $Li_aNi_xCo_yM_zO_2A_f$ material to be tailored to achieve at the same time a high nickel content for high power in the larger particles and a high stabilizing metal content, such as aluminum, for high safety in the smaller ones. Hence, as a result, the relative content of each species is strongly correlated to the size of the particle. The Co content can be kept constant whatever the particle size, as this contributes to make the synthesis easier by maintaining the layered character of the $LiNiO_2$-type material.

Compared to prior art and current $Li_aNi_xCo_yM_zO_2A_f$ materials, the advantages of the invention are:
- improved power performances as the Ni and M content is optimised (resp. increased and decreased) in the large particles while these large particles are known to be limiting the power performances,
- improved safety performances as the Ni and M content is optimised (resp. decreased and increased) in the fine particles while these small size particles are known to be detrimental for safety.

In addition, the presence of a controlled amount of C in the battery increases also its safety.

Preferably, the Ni and M (preferably Al) concentration should follow a continuous increase and decrease respectively with increasing particle size.

Preferably also, the dependency (in % mol) of Ni and M (preferably Al) with particle size should follow a linear trend % mol Ni=s. D+t1, and % mol M=u. D+t2, D being the particle size as measured from SEM pictures, with s>0 or Abs(s)>0.1, preferably >0.4, and more preferably >0.6; and/or Abs(u)>0.05, preferably >0.4, and more preferably >0.6.

In a preferred embodiment, Ni and Al should be homogeneously dispersed within each single particle in order to avoid mechanical stresses while intercalating/deintercalating Li when using the powder in a rechargeable battery.

In another embodiment, the use of a $Li_aNi_xCo_yM_zO_2A_f$ material with a non-homogeneous Ni/Al ratio in its particles in the manufacture of a lithium insertion-type electrode, is disclosed, by mixing said powder with a conductive carbon-bearing additive. The corresponding electrode mixture is also claimed.

The invention is further illustrated in the following examples:

EXAMPLE 1

In a first step, a NCA hydroxide precursor with molar composition 77.5:15:7.5 (Ni+Al=85) is precipitated from Ni, Co and Al sulphates in the presence of NaOH and Ammonia. The obtained NCA hydroxide has a spherical shape and the average particle size as measured from laser granulometry is centered around D50=3.9 μm (D10=0.6 μm, D90=6.5 μm). The NCA hydroxide also contains 2.31% wt of sulphate.

In a second step, a NCA hydroxide precursor with molar composition 80:15:5 (Ni+Al=85) is precipitated from Ni, Co and Al sulphates in the presence of NaOH and Ammonia. The obtained NCA hydroxide shows spherical shape and the average particle size as measured from laser granulometry is centered around D50=6.3 μm (D10=3.9 μm, D90=8.9 μm). The NCA hydroxide also contains 1.95% wt of sulphate.

In a third step, a NCA hydroxide precursor with molar composition 82:15:3 (Ni+Al=85) is precipitated from Ni, Co and Al sulphates in the presence of NaOH and Ammonia. The obtained NCA hydroxide shows spherical shape and the average particle size as measured from laser granulometry is centered around D50=9.4 μm. (D10=6.8 μm, D90=12.8 μm). The NCA hydroxide also contains 1.77% wt of sulphate.

In a last step, the three hydroxide precursor powders as synthesised above are mixed in the ratio 0.3:0.3:0.4 and mixed with LiOH such that Li/(Ni+Co+Al)=1.02. The mixture is then heated in a tubular furnace under an oxygen flow at 750° C. for 20 h. The global composition of the obtained $Li_aNi_xCoyAl_zO_2A_f$ powder as deduced from ICP AES is Ni:Co:Al 80:15:5. Due to the presence of sulphate in the three precursors, the powder obtained contains sulphur of about 0.7% wt. In addition to the hydroxide precursors, the LiOH also contains some $Li_2Co_3$ which leads to a powder containing about 0.15% wt of carbon. The global composition of the powder can thus be written as $Li_aNi_xCo_yAl_zO_2A_f$ with for this example A representing the mixture $S_{1.0}C_{0.5}$ and f being equal to about 0.02.

The particle size distribution of the product after firing is measured by laser diffraction granulometry and shows a psd with D10=1.5 μm, D50=7.6 μm, D90=20.2 μm.

Figure 1:
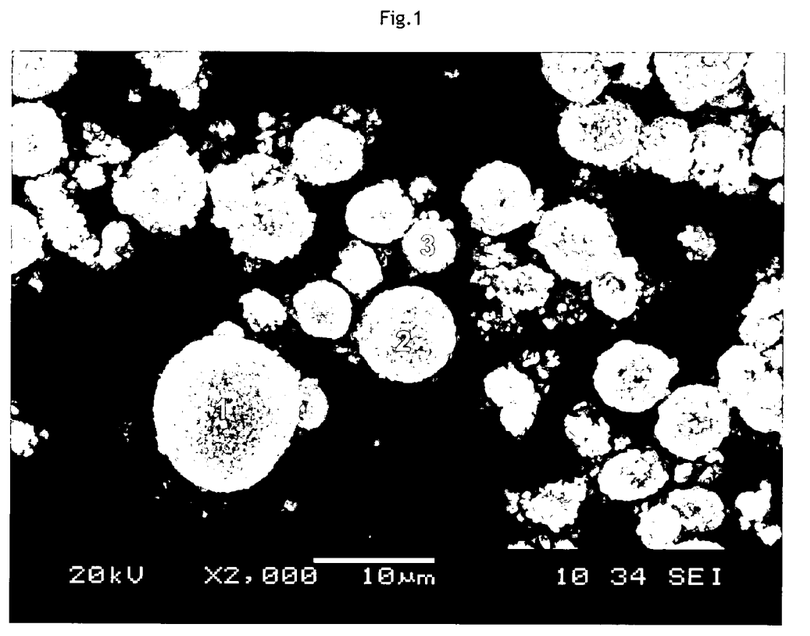
FIG. 1: SEM picture of the material according to the invention showing spherical particles of different sizes.

A FEG-SEM and EDS analysis is performed on the $Li_aNi_xCo_yAl_zO_2A_f$ material made according to Example1 (see FIG. 1). The EDS analysis performed on various particles clearly shows that the chemical composition (Ni/Co/Al) of the final product is varying as a function of its particle size (see Table 1 & FIG. 2).

TABLE 1a

Composition according to particle size

| N° particle | Size from SEM (μm) | EDS % Ni (mol) | EDS % Co (mol) | EDS % Al (mol) |
|---|---|---|---|---|
| 1 | 12.5 | 82.2 | 15.1 | 2.7 |
| 2 | 7.9 | 79.7 | 15.1 | 5.2 |
| 3 | 4.2 | 76.3 | 15.0 | 8.7 |

It can be concluded that the values for D10 and D90 should be as in Table 1b:

TABLE 1b

| particle size | Size (μm) | % Ni (mol) | % Al (mol) |
|---|---|---|---|
| D90 | 20.2 | >82.2 | <2.7 |
| D10 | 1.5 | <76.3 | >8.7 |

Figure 2:
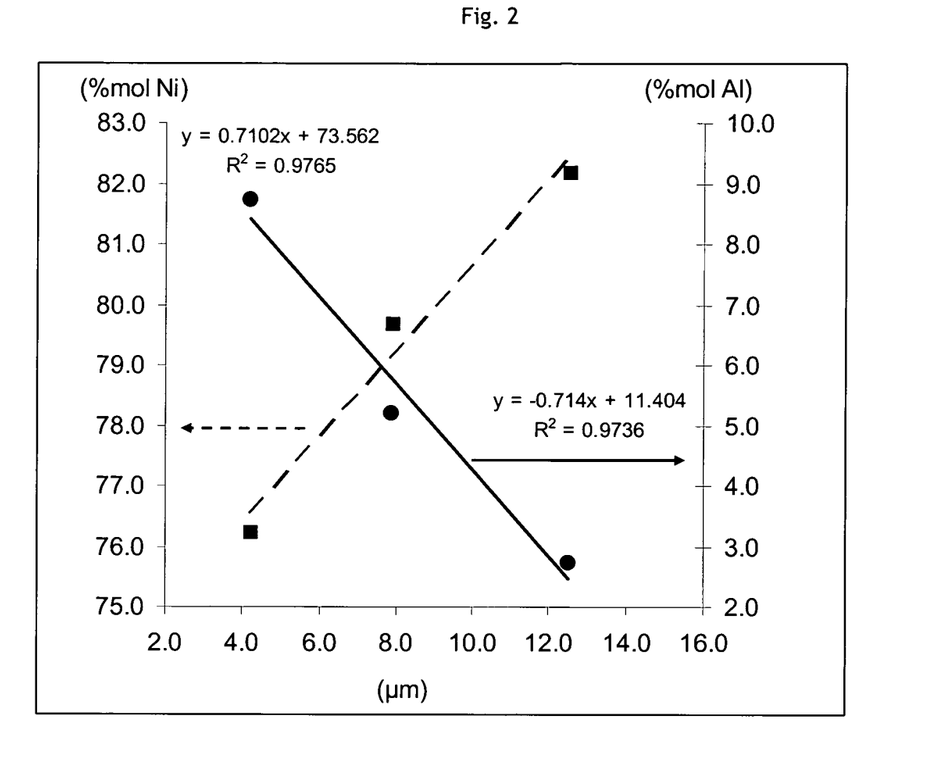
FIG. 2: variation of the Ni and Al content (in mol %) as a function of particle size measured by EDS in the material according to the invention. This measurement clearly shows that the Ni/Al ratio varies continuously with particle size.

As can be deduced from FIG. 2, there is a very good correlation between Ni (and Al) content (% mol) with particle size as measured from SEM picture (D), the linear trend (% mol Ni=s. D+t1 and % mol Al=u. D+t2) being:

for Ni: Ni (% mol)=0.71. D+73.5
for Al: Al (% mol)=−0.71. D+11.4.

Figure 3:
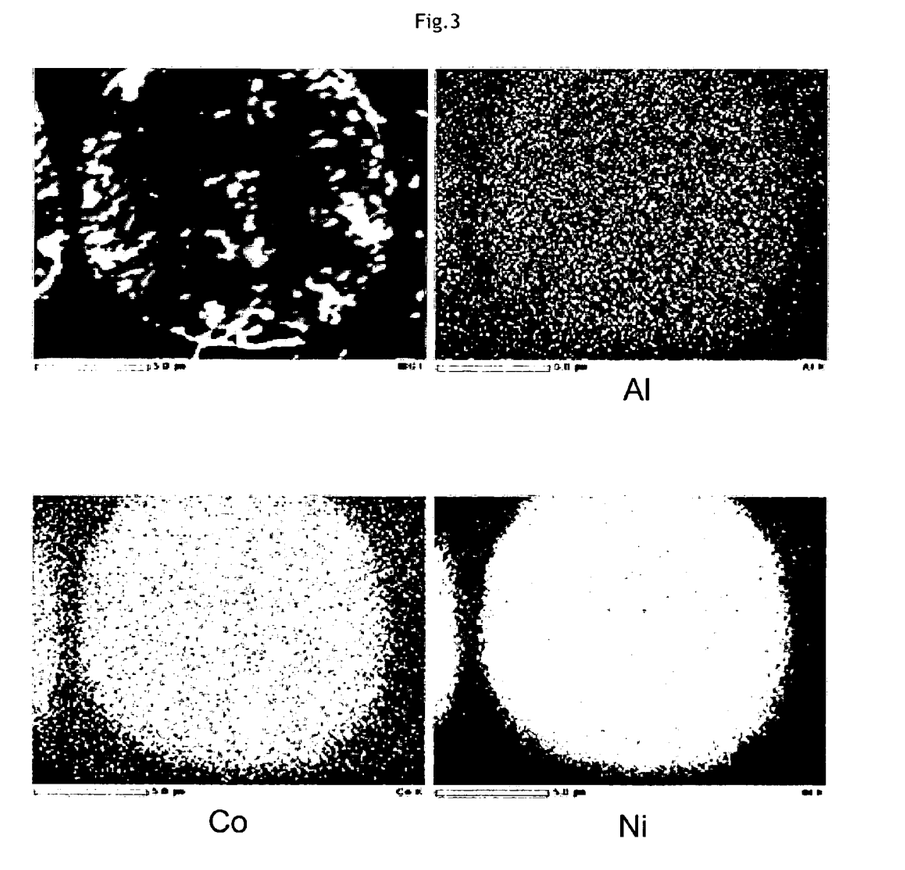
FIG. 3: Ni, Co and Al mapping by EDS on cross-sections of particles of the material according to the invention. This measure clearly shows homogeneous repartition of the species within a single particle.

Moreover, EDS analysis on cross section of a single particle (see FIG. 3) clearly shows that the Ni/Co/Al distribution within a particle is fully homogeneous, with no composition gradient. This allows for optimized electrochemical performances by minimizing the stresses that could occur upon cycling during Li deintercalation/intercalation.

The XRD pattern shows a single phase material corresponding to NCA with FWHM (Full Width at Half Maximum) deduced from XRD profile refinement by Fullprof program for (003) and (110) lines equal to 0.1003 and 0.1314 resp. (in °2θ). As expected, despite the high synthesis temperature, the broad XRD lines suggest the coexistence of several slight deviations from the global composition due to the fact that particles with slightly different composition coexist within the powder. The hexagonal cell parameters as calculated from XRD (full pattern matching refinement) are a=2.846(2)Å and =14.174(8)Å.

Figure 4:
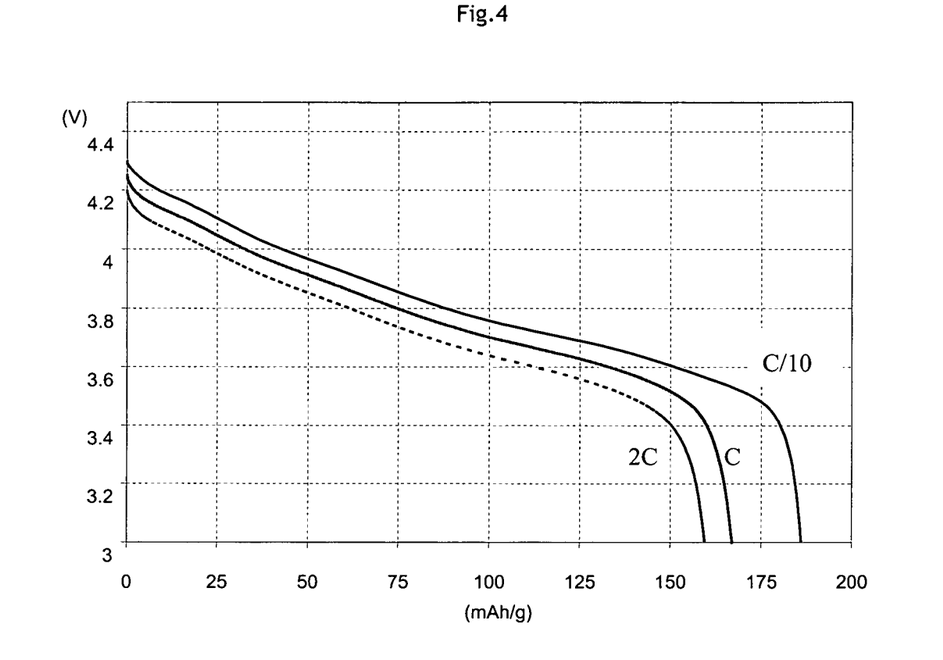
FIG. 4: Galvanostatic discharge curve of the material of the invention at different rates (C/10 (right), C (middle) and 2C (left)). This shows the excellent capacity and power properties of this material.

A slurry is prepared by mixing the NCA powder of Example 1 with 5% wt carbon black and 5% PVDF into N-Methyl Pyrrolidone (NMP), and is deposited on an Al foil as current collector. The obtained electrode containing 90% wt active material is used to manufacture coin cells with 14 mg/cm$^2$ active material. The negative electrodes are made of metallic Li. The coin cells are cycled in LiPF6 based electrolyte between 3.0 and 4.3V vs Li+/Li. FIG. 4 shows that a high reversible capacity is obtained upon cycling with a reversible capacity of 186 mAh/g at a discharge rate of C/10 (full discharge in 10 h). 90% of the capacity is retained at a discharge rate of C (full discharge in 1 h) with 167 mAh/g, and 86% is obtained at a discharge rate of 2C (full discharge in ½h) with 160 mAh/g.

To measure the safety of the material, DSC (differential Scanning calorimetry) measurements are performed on unwashed charged positive electrodes (4.1V/Li+ after charging at C/2 in galvanostatic mode+Constant Current for 1 h) using a NETZSCH calorimeter with a heating ramp of 5° C./min from Room Temperature to 350° C. The total energy released by the exothermic decomposition of the electrode material upon heating is 1000 J/g.

EXAMPLE 2

Counter Example

In first step, a NCA hydroxide material with molar composition 80:15:5 is precipitated from Ni, Co and Al sulphates in the presence of NaOH and Ammonia. The average particle size as measured from laser granulometry is centered around D50=6.1 μm (D10=3.1 μm, D90=10.0 μm). The NCA hydroxide also contains 1.80 wt % of sulphate.

In a second step, the hydroxide is mixed with LiOH such that Li/(Ni$^+$ Co+Al)=1.02. The mixture is then heated in a tubular furnace under oxygen flow at 750° C. for 20 h. The composition of the obtained $Li_aNi_xCo_yAl_zO_2A_f$ powder as deduced from ICP AES is Ni:Co:Al 180:15:5. Due to the presence of sulphate in the precursor, the powder obtained contains sulphur of about 0.6% wt. In addition to the hydroxide precursors, the LiOH also contains some $Li_2Co_3$ which leads to a powder containing about 0.38% wt of carbon. The global composition of the powder can thus be written as $Li_aNi_xCo_yAl_zO_2A_f$ with for this example A representing the mixture $S_{0.8}C_{1.2}C_{1-2}$ and f being equal to about 0.027.

Figure 5:
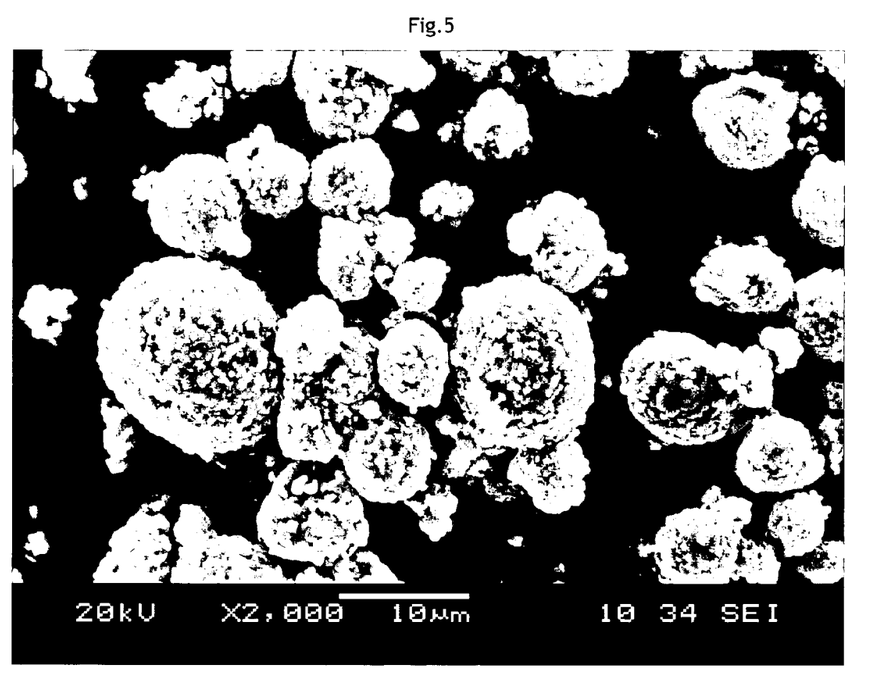
FIG. 5: SEM picture of the state of the art material showing spherical particles of different sizes.

The particle size distribution from the product after firing is measured by laser diffraction granulometry and gives a psd with D10=1.4 μm, D50=7.4 μm, D90=18.1 μm which is considered to be equivalent to that of the product of Example 1. The EDS analysis performed on the product of the counter-example shows that the composition does not vary substantially with the particle size (see FIG. 5 & Table 2).

TABLE 2

Composition according to particle size

| N° particle | Size from SEM (μm) | EDS % Ni (mol) | EDS % Co (mol) | EDS % Al (mol) |
|---|---|---|---|---|
| 1 | 14.6 | 79.7 | 15.1 | 5.2 |
| 2 | 11.5 | 79.4 | 15.0 | 5.6 |
| 3 | 5.0 | 80.3 | 14.7 | 5.0 |

The figures for particles corresponding to the D10 and D90 values correspond to the ones in Table 2.

Figure 6:
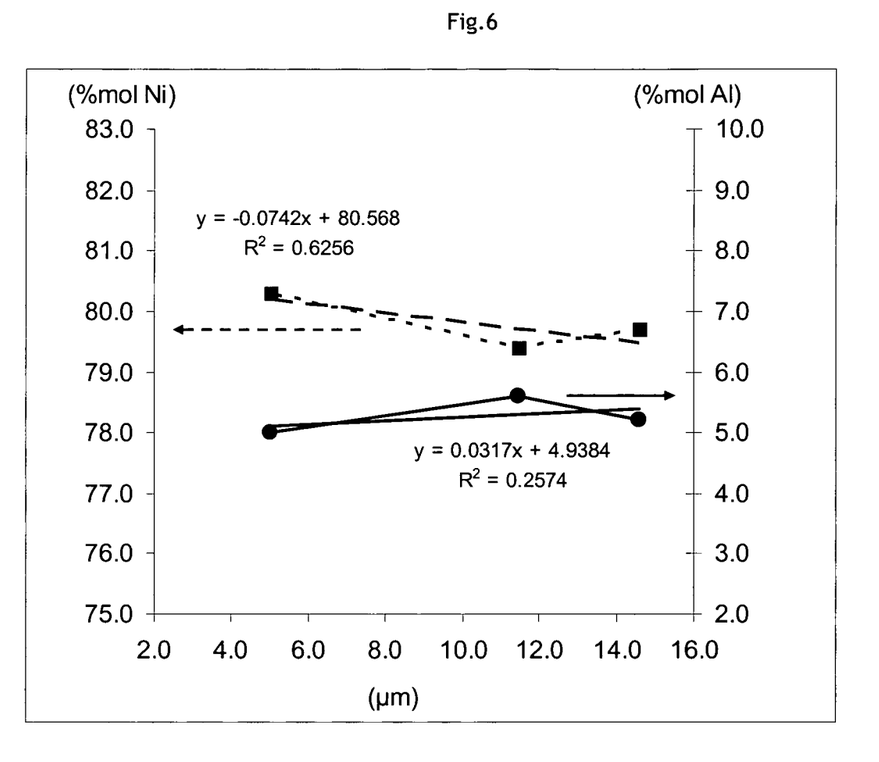
FIG. 6: variation of the Ni and Al content (in mol %) as a function of particle size measured by EDS in the state of the art material. This measurement clearly shows that the Ni/Al ratio is constant whatever the particle size.

As can be deduced from FIG. 6, there is a no correlation between Ni and Al content (% mol) and particle size as measured from the SEM picture (D). Indeed the calculated trends are:

for Ni: Ni (% mol)=−0.07. D+80.5
for Al: Al (% mol)=0.03. D+4.9

The a and b factor in the equations (% mol=s (or u). D+t1 (or t2)) being close to 0 confirms that the Ni and Al contents are constant in the powder.

The XRD pattern show a single phase material corresponding to NCA with FWHM deduced from XRD profile refinement by Fullprof program for (003) and (110) lines equal to 0.082 and 0.1081 resp. (in °2θ). As expected, and in contrast with Example 1, the narrow XRD lines are typical for a product synthetised at high temperature, and suggest that the Ni, Co and Al elements are homogeneously distributed within the powder. The hexagonal cell parameters as calculated from the XRD are a=2.844(1)Å and c=14.172(4)Å. These are considered to be equivalent to those from the product obtained in Example 1—the difference being within the error margin of the cell parameter refinement.

Figure 7:
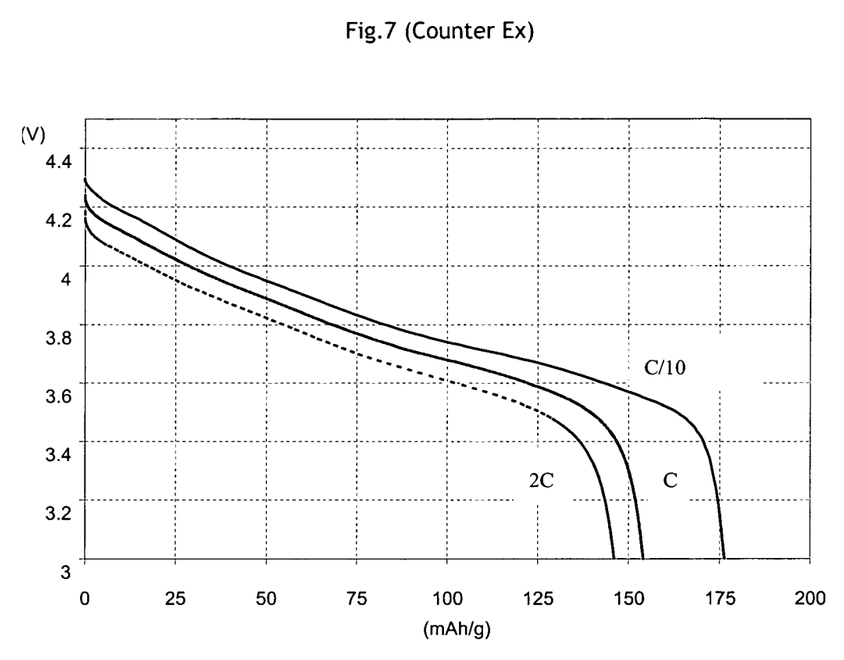
FIG. 7: Galvanostatic discharge curve of the state of the art material at different rates (C/10 (right), C (middle) and 2C (left)). This shows the low capacity and power properties of the state of the art material.

A slurry is prepared by mixing the NCA powder obtained according to Example 2 with 5% wt carbon black and 5% PVDF into N-Methyl Pyrrolidone (NMP), and is deposited on an Al foil as current collector. The obtained electrode containing 90% wt active material is used to manufacture coin cells, with 14 mg/cm$^2$ active material. The negative electrodes are made of metallic Li. The coin cells are cycled in LiPF6 based electrolyte between 3.0 and 4.3V vs Li+/Li. FIG. 7 shows that the reversible capacity obtained upon cycling has a reversible capacity of only 176 mAh/g at a discharge rate of C/10. Only 87% of the capacity is retained at a discharge rate of C with 154 mAh/g, and 83% is obtained at a discharge rate of 2C with 146 mAh/g, i.e. 10% less capacity at high rate than the product according to the invention. This clearly emphasizes the benefit of the invention compared to state of the art materials regarding power properties of NCA materials.

DSC measurements were performed on unwashed charged positive electrodes (4.1V/Li+ after charging at C/2 in galvanostatic mode+Constant Current for 1 h) using a NETZSCH calorimeter with a heating ramp of 5° C./min from RT to 350° C. The total energy released by the exothermic decomposition of the electrode material upon heating is 1200 J/g, which is 20% higher than that of the material according to the invention. This clearly emphasizes the benefit of the invention compared to state of the art materials regarding safety properties of NCA materials.

The invention claimed is:

1. A lithium metal oxide powder for use as a cathode material in a rechargeable battery, having the general formula $Li_aNi_xCo_yM_zO_{2\pm e}A_f$, wherein $0.9 < a < 1.1, 0.3 \leq x \leq 0.9, 0 < y \leq 0.4, 0 < z \leq 0.35, e < 0.02, 0 \leq f \leq 0.05$ and $0.9 < (x+y+z+f) < 1.1$;

wherein M comprises one or more elements selected from the group consisting of Al, Mg, and Ti;
   A comprises either one or both of S and C;
   wherein said powder has a particle size distribution defining a D10, D50 and D90; and
   said x and z parameters vary with the particle size of said powder;
   wherein either one or both of:
   x1−x2≥0.010 and
   z2−z1≥0.010;
   x1 and z1 being the parameters corresponding to particles having a particle size D90; and
   x2 and z2 being the parameters corresponding to particles having a particle size D10.

2. The powder of claim 1, wherein both x1−x2≥0.030 and z2−z1≥0.030.

3. The powder of claim 2, wherein x1−x2≥0.050 and z2−z1≥0.050.

4. The powder of claim 1, wherein the Ni content of said powder increases with increasing particle size, and the M content of said powder decreases with increasing particle size.

5. The powder of claim 1, wherein A comprises S and C, with f≤0.02, and M comprises Al.

6. The powder of claim 1, wherein A comprises C, with f≤0.01, and M comprises Al.

7. The powder of claim 6, having a general formula $Li_aNi_{0.80}Co_{0.15}Al_{0.05}C_{0.01}O_2$.

8. A process for manufacturing the powder of claim 1, comprising:
   providing at least two $Li_aNi_xCo_yM_zO_{2\pm e}A_f$ precursor powders having different particle size distributions with different D10 and D90 values, wherein a powder having lower D10 and D90 values has a lower Ni content and a higher M content than a powder having higher D10 and D90 values,
   mixing said at least two precursor powders together with a lithium precursor, and
   heating said mixture at a temperature of at least 600° C.

9. The process of claim 8, wherein the lithium precursor is lithium hydroxide.

10. The process of claim 8, wherein said precursor powders comprise hydroxide or oxyhydroxide compositions obtained by precipitating metal sulphates, nitrates, chlorides or carbonates in the presence of an alkali hydroxide and a chelating agent.

11. The process of claim 10, wherein the chelating agent is ammonia.

12. The process of claim 8, wherein the Co content of said precursor powders is identical.

* * * * *

UNITED STATES PATENT AND TRADEMARK OFFICE
CERTIFICATE OF CORRECTION

PATENT NO. : 8,673,170 B2  Page 1 of 1
APPLICATION NO. : 13/201896
DATED : March 18, 2014
INVENTOR(S) : Levasseur et al.

It is certified that error appears in the above-identified patent and that said Letters Patent is hereby corrected as shown below:

In the Specification

Column 4, line 62, replace "Coy" with --$Co_y$--;

Column 4, line 66, replace "Co3" with --$CO_3$--;

Column 5, line 1, replace "Coy" with --$Co_y$--;

Column 5, line 8, replace "Coy" with --$Co_y$--;

Column 6, line 24, replace "Ni$^+$" with --Ni+--;

Column 6, line 26, replace "Coy" with --$Co_y$--;

Column 6, line 33, replace "Coy" with --$Co_y$--.

Signed and Sealed this
Tenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,673,170 B2  Page 1 of 1
APPLICATION NO. : 13/201896
DATED : March 18, 2014
INVENTOR(S) : Levasseur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 225 days.

Signed and Sealed this

Twenty-ninth Day of September, 2015

Michelle K. Lee
*Director of the United States Patent and Trademark Office*